United States Patent
Koshino et al.

(10) Patent No.: US 6,996,326 B2
(45) Date of Patent: Feb. 7, 2006

(54) DATA RECORDING APPARATUS AND DATA RECORDING METHOD

(75) Inventors: Toshiharu Koshino, Moriguchi (JP); Toshiki Yamamura, Suita (JP); Tsukasa Yoshiura, Hirakata (JP); Yuji Nagaishi, Daito (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1100 days.

(21) Appl. No.: 09/741,118

(22) Filed: Dec. 20, 2000

(65) Prior Publication Data

US 2001/0024567 A1 Sep. 27, 2001

(30) Foreign Application Priority Data

Dec. 22, 1999 (JP) .......................... 11-364633

(51) Int. Cl.
*H04N 5/94* (2006.01)

(52) U.S. Cl. .......................... 386/47; 386/125; 709/232
(58) Field of Classification Search ............... 386/46, 386/47, 51, 94, 95, 125, 126; 709/232–234
See application file for complete search history.

(56) References Cited

U.S. PATENT DOCUMENTS 5,819,048 A * 10/1998 Okazaki et al. ............. 709/232
6,047,103 A * 4/2000 Yamauchi et al. ............ 386/94
6,073,180 A * 6/2000 Onoda et al. ............... 709/234
6,470,139 B2 * 10/2002 Austin ......................... 386/46
6,535,921 B2 * 3/2003 Hirasawa et al. ........... 709/232
6,587,875 B1 * 7/2003 Ogus .......................... 709/232

FOREIGN PATENT DOCUMENTS

| EP | 0 797 196 B1 | 9/1997 |
| JP | 57-76663 | 5/1982 |
| JP | 60-246152 | 12/1985 |
| JP | 1-221000 | 9/1989 |
| JP | 11-234615 | 8/1999 |
| JP | 11-239168 | 8/1999 |
| JP | 11-331953 | 11/1999 |

* cited by examiner

*Primary Examiner*—James J. Groody
*Assistant Examiner*—Christopher Onuaku
(74) *Attorney, Agent, or Firm*—Akin Gump Strauss Hauer & Feld, LLP

(57) ABSTRACT

An data recording apparatus in accordance with the present invention is configured so as to determine whether a received data block is of the same data to a previously received data block or not on the basis of the data block particular information in the data block transmitted from the outside and stored in a buffer thereby determining the recording-or-not into a disk drive, or so as to determine whether it is to be recorded into the disk drive or not on the basis of the information transmitted from the outside.

15 Claims, 10 Drawing Sheets

FIG. 4

| Order of frame reception | 1 | 2 | 3 | 4 | 5 | 6 | 7 | 8 | 9 | ... |
|---|---|---|---|---|---|---|---|---|---|---|
| ATN | M | M+1 | M+2 | M+3 | M+3 | M+4 | M+5 | M+6 | M+7 | ... |

FIG. 5

RECORDING-OR-NOT INFORMATION MANAGEMENT TABLE

| Bank number | Recording-or-not information |
|---|---|
| 1 | 1 |
| 2 | 1 |
| 3 | 1 |
| 4 | 1 |
| 5 | 0 |
| 6 | 1 |
| 7 | 1 |
| 8 | 1 |
| ⋮ | ⋮ |

DATA RECORDING APPARATUS AND DATA RECORDING METHOD

BACKGROUND OF THE INVENTION

The present invention relates to a data recording apparatus and a data recording method for recording audio-visual data to a disk drive.

In recent years, there has been rapid improvement in the performance, such as recording capacity and transfer speed, of a magnetic disk drive, an optical disk drive, and the like. In particular, the improvement is remarkable in the performance of a hard disk drive (HDD), which has accelerated the frequent use of such an HDD in the recording and reproducing of audio-visual data.

Meanwhile, with the progress in the development of a digital interface, it has become frequent that a digital video device (abbreviated as DV device hereafter), such as a digital VCR, is equipped with a digital interface in accordance with IEEE1394 Standard (abbreviated as an IEEE1394 interface hereafter). The IEEE1394 Standard prescribes the isochronous transfer scheme in which digital audio-visual data is transferred continuously. With regard to the transfer scheme using the IEEE1394 interface, IEC61883 prescribes, for example, a transfer scheme for the audio-visual data in DV format.

In particular, many systems have been proposed recently in which a DV device equipped with an IEEE1394 interface is connected to a personal computer (abbreviated as a PC hereafter) thereby editing the video data shot with a DV device.

The editing process in such a system is carried out in the following procedure:

1. Audio-visual data shot with a DV device is taken into an HDD built into a PC (abbreviated as a PC-installed HDD hereafter), 2. The audio-visual data taken into the PC-installed HDD is processed so that the length of scene are adjusted, the scenes are reorganized, video effects are applied, and so on. Then, the data is saved in the PC-installed HDD again, and 3. The processed audio-visual data is read out from the PC-installed HDD and written back through the IEEE1394 interface onto the DV device.

However, during the third process of the above-mentioned editing system, "frame dropping" has frequently occurred on the PC side. The frame dropping is caused by that the audio-visual data to be written in back to the DV device can not be read out from the PC-installed HDD in a predetermined time, for example, when another application software accesses the PC-installed HDD during the process of writing back onto the DV device, when the PC-installed HDD has a slow readout speed, or when the PC-installed HDD suffers from a strong shock or vibration. In case of the occurrence of frame dropping, the PC performs the process of re-transmitting, to the IEEE1394 interface, the video frame data read out just previously from the PC-installed HDD (this process is referred to as a frame re-transmission control process hereafter). By the frame re-transmission control process, the PC continues to transmit the audio-visual data in the DV format to the DV device continuously.

In case that all of the audio-visual data underwent the frame re-transmission control process owing to the occurrence of frame dropping in the PC as a transmitting device is recorded in the DV device as a receiving device, as described above, there has been a problem that the recording time of the audio-visual data recorded in the DV device becomes longer than that of the original audio-visual data saved in the PC-installed HDD.

BRIEF SUMMARY OF THE INVENTION

An object of the present invention is, in case of the occurrence of frame dropping during the operation of writing in the audio-visual data from the transmitting device to the receiving device, to provide a data recording apparatus capable of recording an audio-visual data to the disk of a disk drive with the same recording time length as the original audio-visual data saved on transmitting device, by means of controlling the DV data transmitted from the transmitting device in the frame re-transmission control process so as not to be recorded in the disk drive of a receiving device.

To achieve the above-mentioned object, a data recording apparatus in accordance with the present invention comprises:

data transmitting and receiving means for transmitting and receiving the data to and from the outside;

a buffer capable of storing the data temporarily;

buffer controlling means for controlling the input and output of the data to and from the buffer;

a disk drive capable of recording the data;

data recording and reproducing means for recording and reproducing the data into and from the disk drive;

data recording determining means for determining whether the data stored in the buffer is to be recorded or not in the disk drive and generating the recording-or-not information;

record data managing means for managing the recording-or-not information for the data stored in the buffer; and data recording controlling means for controlling the buffer controlling means and the data recording and reproducing means so as to perform the recording control of the data in the buffer into the disk drive; wherein the data transmitting and receiving means sequentially transfers the data received from the outside into the buffer controlling means, and the buffer controlling means stores the transferred data into the buffer and notifies the completion of receiving a data block to the data recording determining means at each time when the data block in a predetermined unit is stored in the buffer.

In a data recording apparatus in accordance with another aspect of the present invention, the data recording determining means reads the particular information capable of identifying from the other data blocks, from a data block stored in the buffer, determines whether the received data block is the same as a data block received previously or not on the basis of the read particular information, and notifies the recording-or-not information whether the received data block is to be recorded in the disk drive or not to the record data managing means on the basis of the result of the determination, and the record data managing means stores the recording-or-not information correspondingly to the data block stored in the buffer, and the data recording controlling means retrieves the recording-or-not information corresponding to the data block stored in the buffer, and performs transfer control on the data recording and reproducing means on the basis of the retrieved recording-or-not information.

A data recording method in accordance with the present invention comprises the steps of:

transmitting and receiving the data to and from the outside by data transmitting and receiving means;

storing the data temporarily by a buffer;

controlling the input and output of the data to and from the buffer by buffer controlling means;

recording the data by a disk drive;

recording and reproducing the data into and from the disk drive by data recording and reproducing means;

determining whether the data stored in the buffer is to be recorded or not in the disk drive and generating the recording-or-not information by data recording determining means;

managing the recording-or-not information for the data stored in the buffer by record data managing means;

controlling the buffer controlling means and the data recording and reproducing means so as to perform the recording control of the data in the buffer into the disk drive by data recording controlling means;

sequentially transferring the data received from the outside into the buffer controlling means by the data transmitting and receiving means;

storing the transferred data into the buffer by the buffer controlling means; and notifying the completion of receiving a data block to the data recording determining means at each time when the data block in a predetermined unit is stored in the buffer.

In a data recording method in accordance with another aspect of the present invention, the data recording determining means reads the particular information capable of identifying from the other data blocks, from a data block stored in the buffer, determines whether the received data block is the same as a data block received previously or not on the basis of the read particular information, and notifies the recording-or-not information whether the received data block is to be recorded in the disk drive or not to the record data managing means on the basis of the result of the determination, and the record data managing means stores the recording-or-not information correspondingly to the data block stored in the buffer, and the data recording controlling means retrieves the recording-or-not information corresponding to the data block stored in the buffer, and performs transfer control on the data recording and reproducing means on the basis of the retrieved recording-or-not information.

The data recording apparatus and the data recording method configured as described above in accordance with the present invention are capable of recording, in a disk drive, the data having the same recording time as the original audio-visual data saved on transmitting device side, by controlling the DV frame transmitted by the frame re-transmission control process so as not to be recorded in the disk drive in case of the occurrence of frame dropping on the transmitting device side.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 4 is a diagram describing the order of the reception of DV frame data in accordance with the embodiment of the present invention;

FIG. 5 is a diagram describing a recording-or-not information management table in accordance with the embodiment of the present invention;

It will be recognized that some or all of the Figures are schematic representations for purposes of illustration and do not necessarily depict the actual relative sizes or locations of the elements shown.

DETAILED DESCRIPTION OF THE INVENTION

Preferred embodiments of a data recording apparatus in accordance with the present invention are described below with reference to the accompanied drawings of attached FIGS. 1 to 10.

Figure 1:
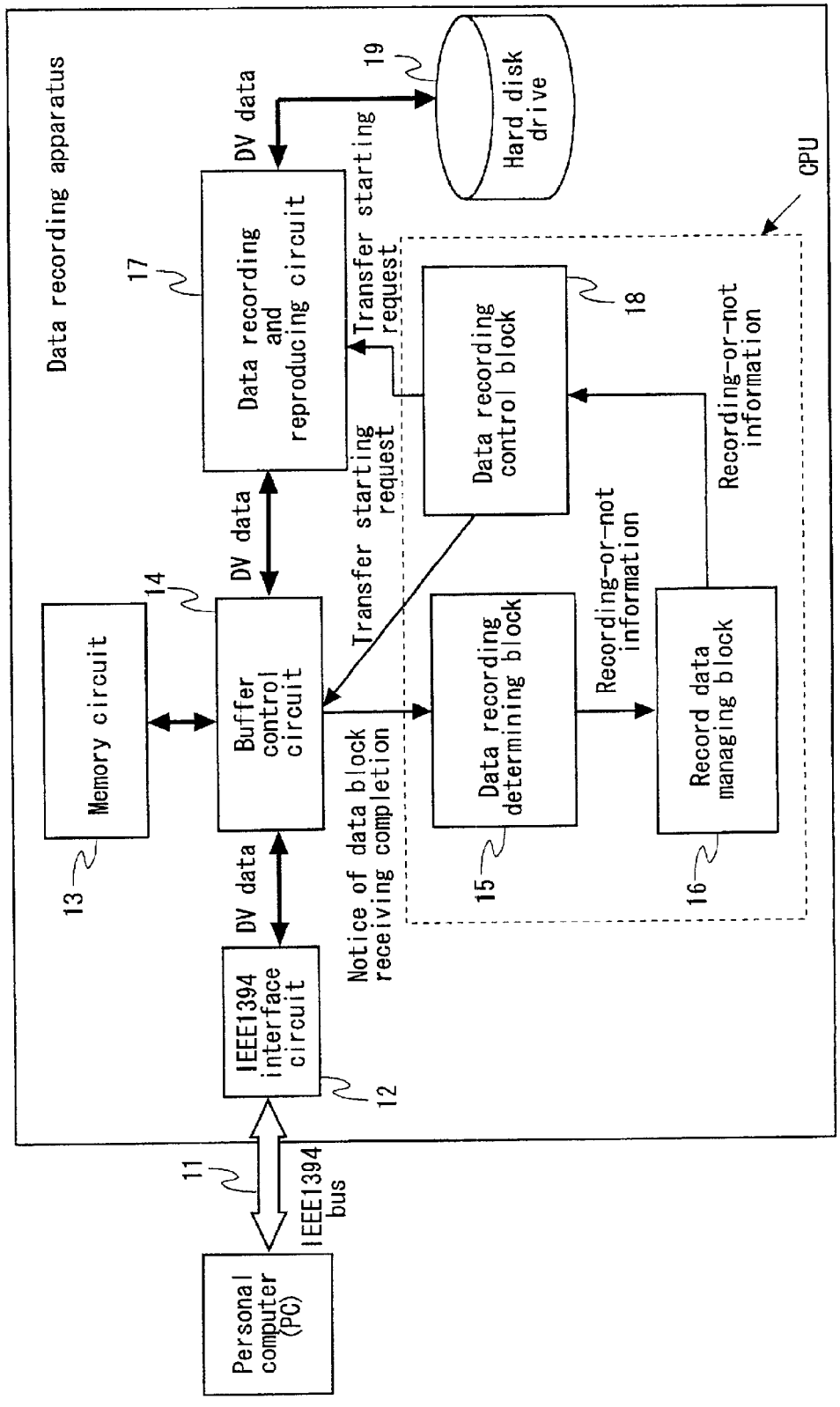
FIG. 1 is a block diagram showing the configuration of a data recording apparatus in accordance with an embodiment of the present invention.

FIG. 1 is a block diagram showing the configuration of a data recording apparatus in accordance with a preferred embodiment of the present invention.

The data recording apparatus shown in FIG. 1 is connected to an IEEE1394 bus 11 for transferring the audio-visual data from a personal computer (abbreviated as a PC hereafter). In the data recording apparatus, an IEEE1394 interface circuit 12 is data transmitting and receiving means for transmitting and receiving the audio-visual data and various commands, such as REC commands (recording requests) and PLAY commands (reproducing requests), through the IEEE1394 bus 11 to and from the PC. As shown in FIG. 1, the data recording apparatus of the present embodiment comprises a memory circuit 13, a buffer control circuit: 14, a data recording and reproducing circuit 17, and a hard disk drive 19 in addition to the IEEE1394 interface circuit 12.

The memory circuit is a buffer capable of storing the data temporarily, and the buffer control circuit 14 is buffer controlling means for controlling the data input and output for the memory circuit 13. The hard disk drive 19 is a disk drive capable of recording and reproducing the data, and the data recording and reproducing circuit 17 is data recording and reproducing means for recording the audio-visual data into the hard disk drive 19.

The data recording apparatus further comprises a central processing unit (CPU). The CPU has a data recording determining block 15, a record data managing block 16, and a data recording control block 18, as the software processing functions.

The data recording determining block 15 as data recording determining means is for determining whether the audio-visual data stored in the memory circuit 13 is to be stored or not in the hard disk drive 19. The record data managing block 16 as record data managing means is for managing the recording-or-not information for the audio-visual data stored in the memory circuit 13. The data recording control block 18 as data recording controlling means is for controlling the buffer control circuit 14 and the data recording and reproducing circuit 17 so that the audio-visual data in the memory circuit 13 is recorded in the hard disk drive 19.

The data recording apparatus shown in FIG. 1 accepts the below-mentioned commands (1) to (4) which are input from the PC through the IEEE1394 bus 11, and performs the recording operation in response to each command which is input correspondingly to the audio-visual data received from the PC.

(1) Ordinary REC Command:

All the received DV data is recorded. In the data recording apparatus of the present embodiment, all of the DV data which is the audio-visual data received using a known art is recorded in the hard disk drive 19 in response to the ordinary REC command.

(2) Data Extraction REC Command:

Necessary DV frame data is selected from the received DV data every a DV frame unit, and recorded. The same DV frame data transmitted repeatedly by the frame re-transmission control process of the PC is not recorded in the hard disk drive 19.

(3) Frame Shot Command:

When a frame shot command is received from the PC, the DV frame data being received currently or received just previously alone among the received DV data is recorded in the hard disk drive 19.

(4) Frame Search Record Command:

The DV frame data coincident with the condition specified by the PC alone among the received DV data is recorded in the hard disk drive 19.

The operation of the data recording apparatus of the present embodiment in the case of receiving the data extraction REC command, the frame shot command, or the frame search record command is described below.

[Data Extraction REC Command Operation]

First, the operation of the data recording apparatus of the present embodiment in the case of receiving the data extraction REC command is described below with reference to FIGS. 1 to 8.

First, the IEEE1394 interface circuit 12 in the data recording apparatus sequentially transfers the received DV data to the buffer control circuit 14.

Figure 2:
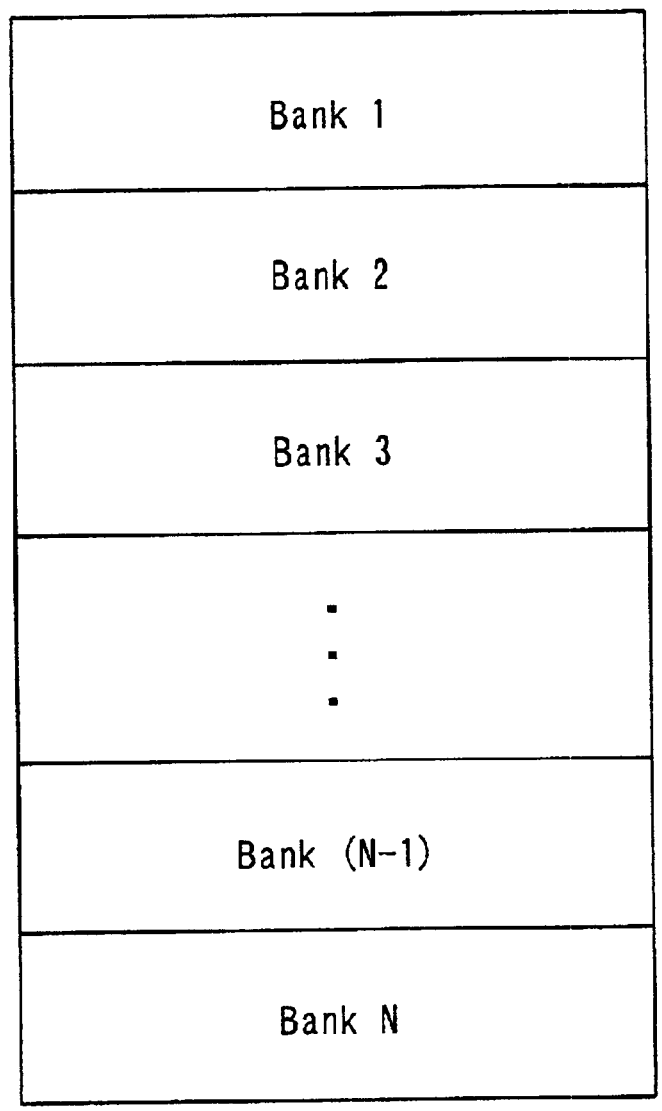
FIG. 2 is a diagram describing the bank configuration formed in a memory circuit in accordance with the embodiment of the present invention.

The buffer control circuit 14 sequentially stores, in a predetermined address of the memory circuit 13, the DV data transferred from the IEEE1394 interface circuit 12. FIG. 2 shows the storing region (banks) of the memory circuit 13. As shown in FIG. 2, the memory circuit 13 is divided into banks each being set to a video frame unit (120 kBytes) in DV format. The buffer control circuit 14 issues a frame storing notice to the data recording determining block 15 when storing the DV frame data in each bank.

The data recording apparatus of the present embodiment performs the following first recording determination process in response to the frame storing notice notified by the buffer control circuit 14.

Figure 3:
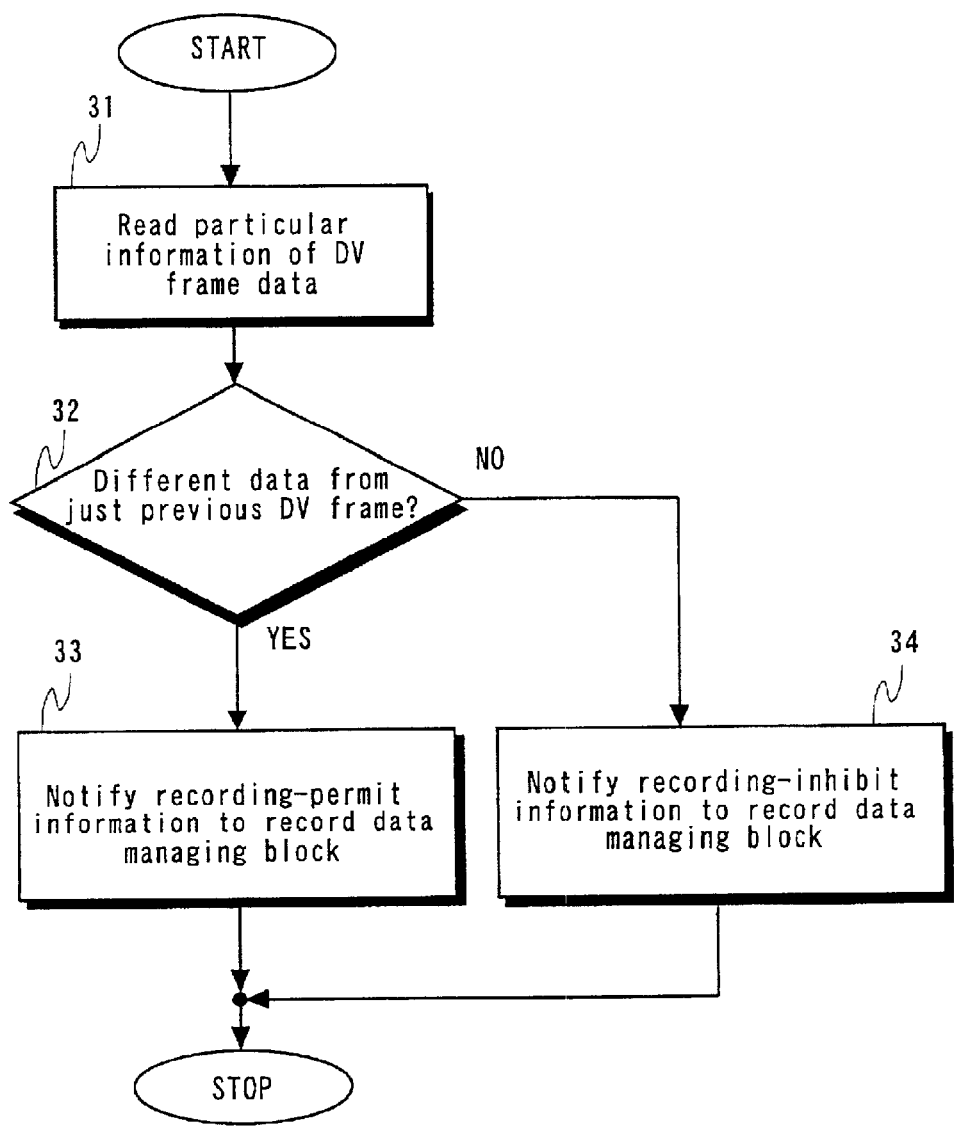
FIG. 3 is a flow chart showing the operation of a data recording determining block in accordance with the embodiment of the present invention when receiving a data extraction REC command.

The data recording determining block 15 performs the first recording determination process in response to the frame storing notice notified by the buffer control circuit 14, and carries out the recording determination whether the DV frame data is to be recorded in the hard disk drive 19 or not. FIG. 3 is a flow chart showing the procedure of the first recording determination process in the data recording determining block 15.

The procedure of the first recording determination process in the data recording determining block 15 is described below with reference to FIG. 3.

Firstly in the procedure of the first recording determination process of FIG. 3, in Step 31, the absolute track number (ATN) is read out from the DV frame data in the memory circuit 13 as the data block particular information. The ATN generally indicates the recording position on a magnetic recording tape. In the present embodiment, a particular number of ATN in the order of transmission is assigned to the DV frame data transmitted from the PC, and the same number is assigned to the same DV frame data.

In Step 32, the determination is carried out whether the DV frame data is to be recorded in the hard disk drive 19 or not on the basis of the read-out ATN. The recording determination is carried out by checking whether the ATN is the same as the ATN of the DV frame data stored just previously, or not. In the step 32, when these ATN's are different from each other, the data recording determining block 15 determines that the different DV frame data is received and that the DV frame data is the DV frame data to be recorded (referred to as record frame data hereafter). On the other hand, when the ATN is the same as the ATN of the DV frame data stored just previously, the data recording determining block 15 determines that the same DV frame data is received and that the DV frame data is the DV frame data not to be recorded (referred to as disposal frame data hereafter).

When the data recording determining block 15 is determined as record frame data, in Step 33, the record data managing block 16 is notified that this DV frame data is recording-permitted. On the other hand, when the data recording determining block 15 is determined as disposal frame data, in Step 34, the record data managing block 16 is notified that this DV frame data is recording-inhibited.

FIG. 4 is a table showing an exemplary relation between the order of the reception of DV frame data and the ATN's. The description is made for the case that the DV frame data is received and that the DV frame data has the ATN's as shown in FIG. 4. Since the fourth arrived DV frame data and the fifth arrived DV frame data have the same ATN in the buffer control circuit 14, the data recording determining block 15 determines that the fifth DV frame data is disposal frame data and that the other data is record frame data. As the result, the recording determination result is notified to the record data managing block 16.

The record data managing block 16 generates a recording-or-not information management table for managing the recording-or-not information corresponding to each bank on the basis of the recording determination result notified by the data recording determining block 15. FIG. 5 shows the recording-or-not information management table.

When the DV frame data is received in the order shown in FIG. 4, the recording-or-not information management table shown in FIG. 5 is generated. In FIG. 5, the recording-or-not information of "1" indicates that the DV frame data stored in the bank is record frame data, and the recording-or-not information of "0" indicates that the DV frame data stored in the bank is disposal frame data.

The data recording control block 18 performs the recording control whether the DV frame data in the memory circuit 13 is transferred at each frame data to the hard disk drive 19 or not.

Figure 6:
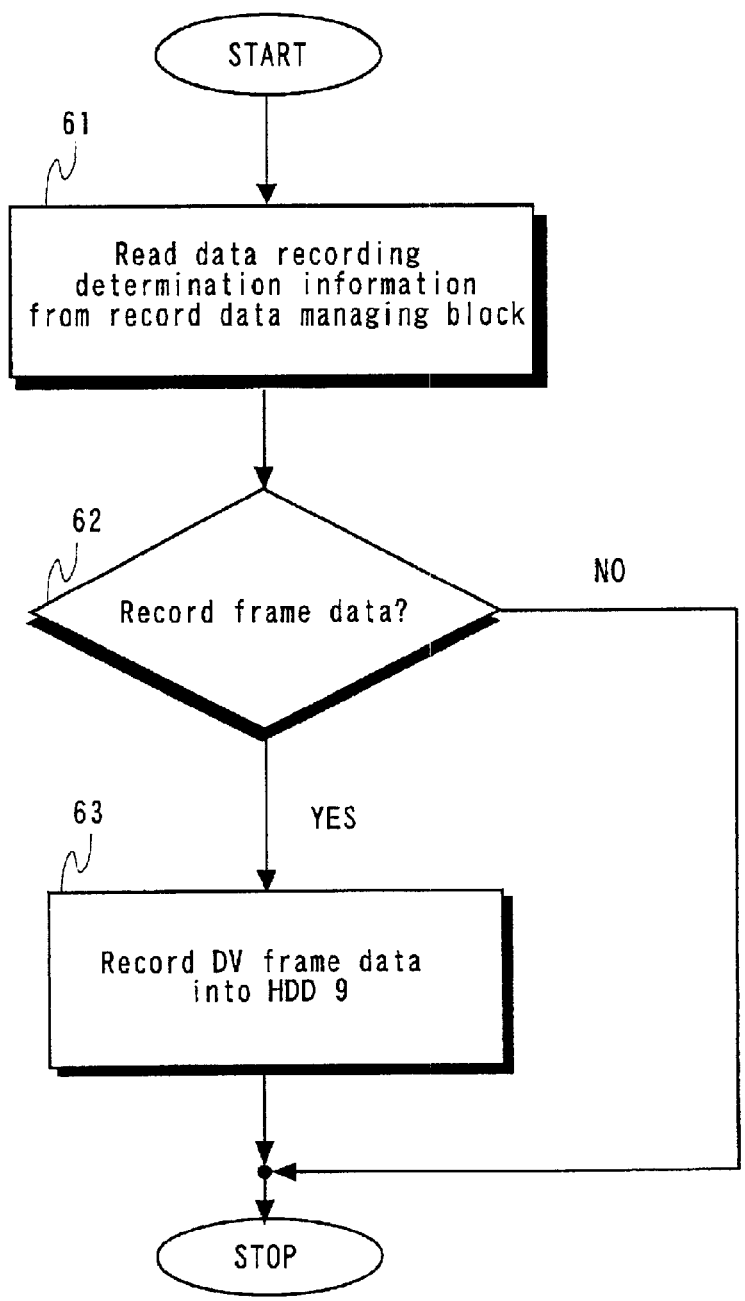
FIG. 6 is a flow chart showing the operation of a data recording control block in accordance with the embodiment of the present invention.

The procedure of the recording control process in the data recording control block 18 is described below. FIG. 6 is a flow chart showing the procedure of the recording control process.

In Step 61 of the procedure of the recording control process, the record data managing block 16 is inquired of about the recording-or-not information corresponding to the data stored in the memory circuit 13.

In Step 62, the determination is carried out whether the DV frame data is record frame data or disposal frame data on the basis of the recording-or-not information notified by the record data managing block 16. When the DV frame data is record frame data, the processing proceeds to Step 63. On the other hand, when the DV frame data is disposal frame data, this recording control process is terminated and the recording control process for the next DV frame data is carried out.

In Step 63, a transfer request is issued to the buffer control circuit 14 so as to read out the record frame data from the memory circuit 13, and a recording request is issued to the data recording and reproducing circuit 17 so as to record the record frame data read out from the memory circuit 13 into the hard disk drive 19.

As described above, the data recording apparatus of the present embodiment can record necessary DV frame data alone, because only the DV frame data having arrived first is recorded and the subsequent DV frame data is disposed when the same DV frame data is received during the command process in response to the data extraction REC command.

In the present embodiment, it is determined whether the DV frame data is the same as the just previous DV frame data or not by reading out the ATN from the DV frame data. However, any information, such as title time code (TTC), particular to the DV frame data may be used without restriction by the configuration of the above-mentioned embodiment. Here, the TTC is time information from the start of the video information, and has the information of "hour:minute:second:frame" for each frame.

The data recording apparatus of the present embodiment performs a second recording determination process in which recording-or-not is determined on the basis of predetermined data (VAUX information, data format information, and the like) within the DV frame data, disposal frame data is registered in a recording-or-not information management table, and the registered disposal frame data is controlled so as not to recorded in the hard disk drive 19. Here, the VAUX (Video auxiliary) information is auxiliary information of the video, and contains the validity/invalidity of -the video data, signal format, compression format, and the like.

Described below is the procedure of the second recording determination process provided in the data recording determining block 15 for performing the above-mentioned second recording determination function in the present embodiment.

Figure 7:
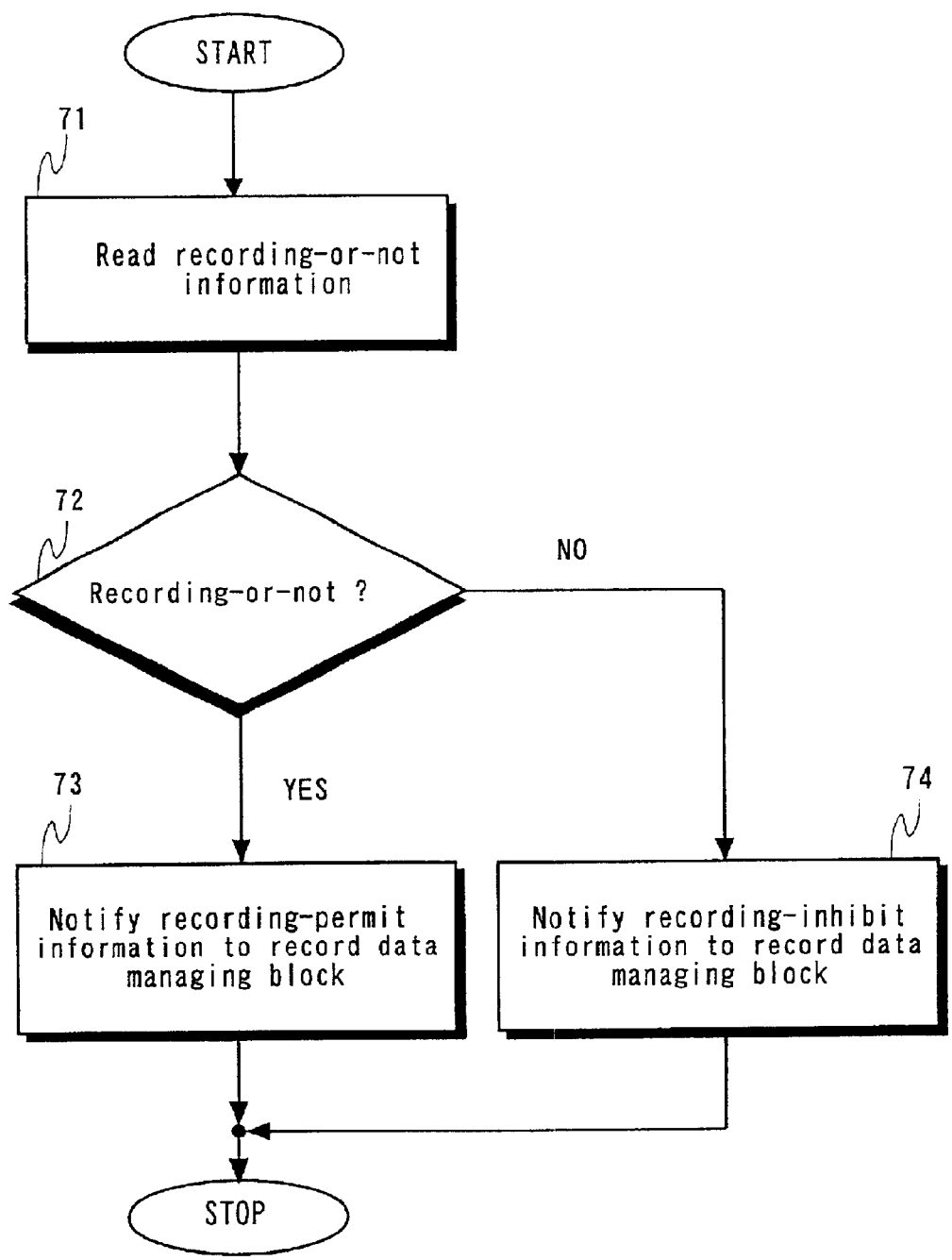
FIG. 7 is a flow chart showing the operation of a data recording determining block in accordance with the embodiment of the present invention when receiving a data extraction REC command.

FIG. 7 is a flow chart showing the procedure of the second recording determination process in the data recording determining block 15.

First, in Step 71 of the procedure of the second recording determination process, video additional data (VAUX information) is read out from the DV frame data in the memory circuit 13 as the recording-or-not information.

Next, in Step 72, the information indicating the validity of invalidity of the video data is detected, which is recorded in the read-out VAUX information. As the result, the data recording determining block 15 determines that the data the video data of which is valid is record frame data and that the data the video data of which is invalid is disposal frame data.

In Steps 73 and 74, the recording determination result is notified to the record data managing block 16 similarly to the procedure of the above-mentioned first recording determination process (Steps 33 and 34 in FIG. 3).

The record data managing block 16 generates a recording-or-not information management table (FIG. 5) for managing the recording-or-not information corresponding to each bank on the basis of the recording determination result notified by the data recording determining block 15 as described above.

The data recording control block 18 performs the recording control whether the DV frame data in the memory circuit 13 is transferred on a frame data basis to the hard disk drive 19 or not, as shown in the flow chart of FIG. 6 showing the procedure of the recording control process.

The operation of the record data managing block 16 and the data recording control block 18 after the second recording determination process in the data recording apparatus of the present embodiment is substantially the same as the operation after the above-mentioned first recording determination process.

As mentioned above, the data recording apparatus of the present embodiment can dispose invalid video data among the received DV frame data, thereby recording valid video data alone in the hard disk drive 19. In the present embodiment, it is determined whether the DV frame data is to be recorded in the disk drive or not on the basis of the VAUX information. However, the determination of the recording-or-not to the disk drive may be carried out by detecting the recording-or-not information written in a portion of the DV frame data by the PC.

The data recording apparatus of the present embodiment further comprises a third recording determination function of performing the recording control on the basis of the data format of the received DV frame data.

Figure 8:
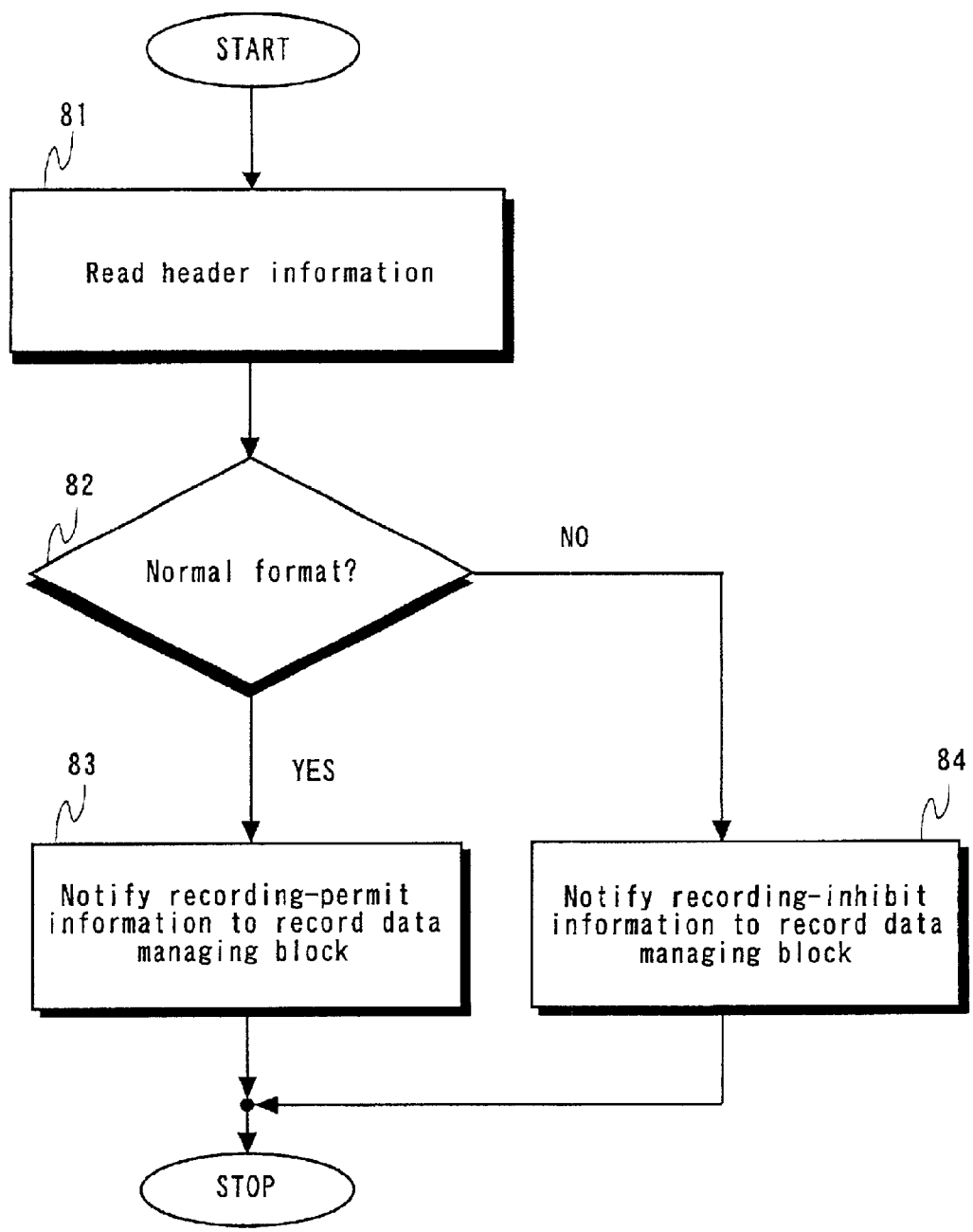
FIG. 8 is a flow chart showing the operation of a data recording determining block in accordance with the embodiment of the present invention when receiving a data extraction REC command.

The procedure of the third recording determination process carried out by the data recording determining block 15 in order to perform the above-mentioned third recording determination function in the data recording apparatus of the present embodiment is described below with reference to FIG. 8. FIG. 8 is a flow chart showing the procedure of the third recording determination process.

In FIG. 8, on receiving a frame storing notice from the buffer control circuit 14, in Step 81, the data recording determining block 15 reads out the header information of DIF sequence block from the DV frame data. Here, the DIF sequence block is the unit of a transfer block when the DV data is transferred to the IEEE1394 bus. The NTSC signal is divided into ten, and the PAL signal is divided into twelve.

In Step 82, whether the read-out header information is an abnormal format or not is determined by comparing the data pattern of the header information read out in Step 81 and the data pattern of the standard header information.

When the read-out header information is normal, in Step 83, the record data managing block 16 is notified that the received DV frame data is record frame data. On the other hand, when the read-out header information is abnormal, in Step 84, the record data managing block 16 is notified that the received DV frame data is disposal frame data.

The record data managing block 16 generates a recording-or-not information management table (FIG. 5) for managing the recording-or-not information corresponding to each bank on the basis of the recording determination result notified by the data recording determining block 15 as described above.

The data recording control block 18 performs the recording control whether the DV frame data in the memory circuit 13 is transferred on a frame data basis to the hard disk drive 19 or not, as shown in the flow chart of FIG. 6 showing the procedure of the above-mentioned recording control process.

The operation of the record data managing block 16 and the data recording control block 18 after the third recording determination process in the data recording apparatus of the present embodiment is substantially the same as the operation after the above-mentioned first recording determination process.

By the above-mentioned operation of the record data managing block 16 and the data recording control block 18, abnormal format data among the received DV frame data is disposed, and normal DV frame data alone is recorded in the hard disk drive 19.

In the present embodiment:, the recording-or-not determination is carried out on the basis of the header information of DIF sequence block. However, any information capable of determination of the normalness or abnormalness may be used without restriction by the configuration of the above-mentioned embodiment.

[Frame Shot Command Operation]

The operation of the frame shot command issued by the PC and received by the data recording apparatus through the IEEE1394 bus 11 is described below.

At the same time that the DV data is continuously transmitted to the IEEE1394 bus 11 by the PC, the DV data is reproduced as a video by the PC and displayed on the monitor of the PC.

A user selects a preferable video among the videos displayed on the monitor of the PC. When the preferable video is displayed, the user issues a frame shot command to the data recording apparatus through frame shot command issuing means.

Figure 9:
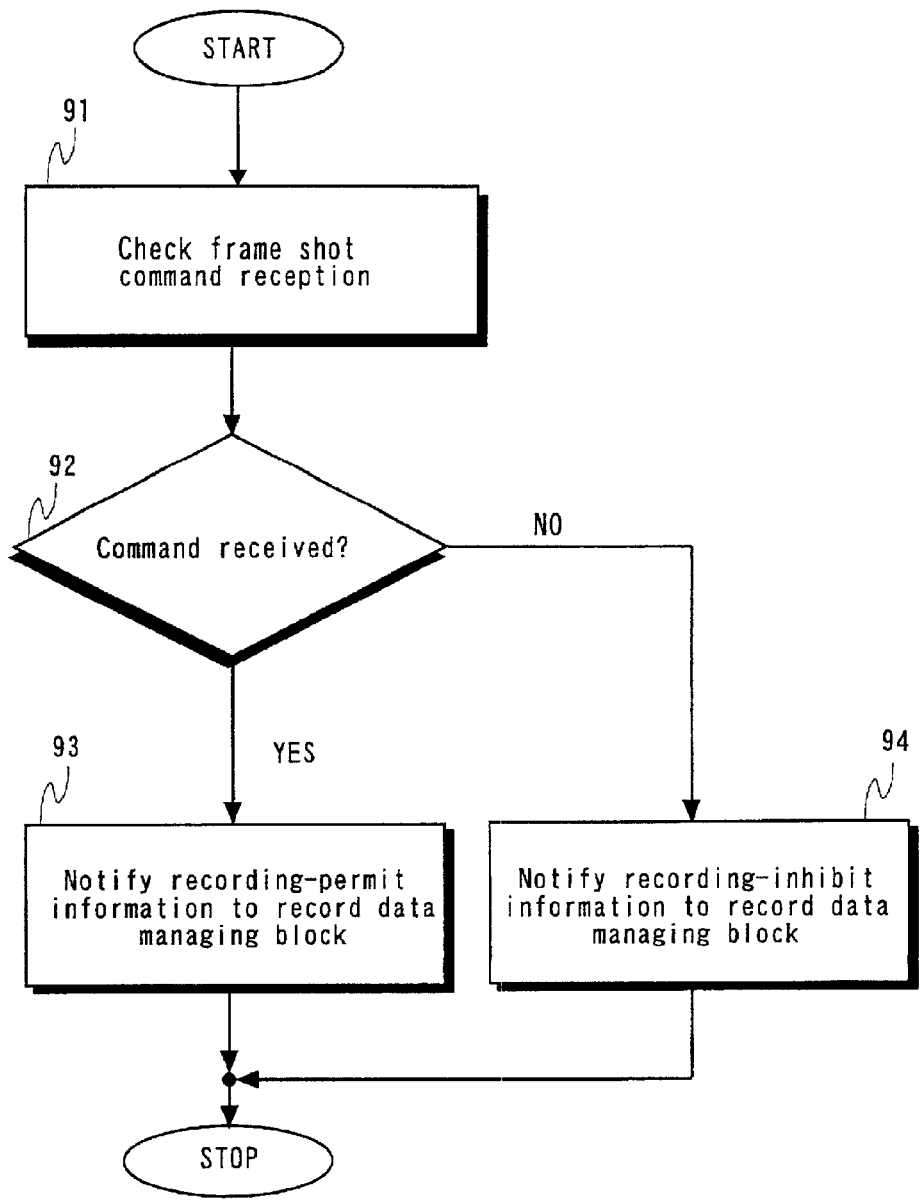
FIG. 9 is a flow chart showing the operation of a data recording determining block in accordance with the embodiment of the present invention when receiving a frame shot command.

On receiving the frame shot command, the data recording apparatus performs a fourth recording determination process described later, thereby recording the DV frame data being received in to the hard disk drive 19. Accordingly, the use can record the preferable DV data alone among the continuously reproduced DV data into the hard disk drive 19 on a frame basis The fourth recording determination process in the case that the data recording determining block 15 receives the frame shot command is described below with reference to FIG. 9. FIG. 9 is a flow chart showing the procedure of the fourth recording determination process in the data recording determining block 15. FIG. 9 shows the operation of the data recording determining block 15 when a frame storing notice is input from the buffer control circuit 14.

In the data recording determining block 15, the operation of recording-or-not determination when the frame shot command is input is the different one from the operation when the above-mentioned data extraction REC command is input.

The procedure of the fourth recording determination process in the data recording determining block 15 is described below.

First, in Step 91, the checking operation is performed whether a frame shot command is being received for the outside (for example, a PC) or not.

Next, in Step 92, it is determined whether the frame shot command is received or not.

When the frame shot command is received, in Step 93, the record data managing block 16 is notified that the received DV frame data is record frame data. On the other hand, when the frame shot command is not received, in Step 94, the record data managing block 16 is notified that the received DV frame data is disposal frame data.

The record data managing block 16 generates a recording-or-not information management table (FIG. 5) for managing the recording-or-not information corresponding to each bank on the basis of the recording determination result notified by the data recording determining block 15 as described above. The data recording control block 18 performs the recording control whether the DV frame data in the memory circuit 13 is transferred on a frame data basis to the hard disk drive 19 or not, as shown in the flow chart of FIG. 6 showing the procedure of the above-mentioned recording control process.

The record data managing block 16 and the data recording control block 18 operate substantially similarly to the process in response to the above-mentioned data extraction REC command. Accordingly, only the DV frame data which is being received at the time of the reception of the frame shot command is recorded in the hard disk drive 19.

[Frame Search Record Command]

The operation of a frame search record command received by the data recording apparatus through the IEEE1394 bus 11 is described below.

The frame search record command is a command issued when a user wants to record the previously selected DV frame data alone. For example, the DV frame data having a predetermined ATN can be recorded, and the DV frame data shot on a predetermined day alone among the DV data shot on various days can be recorded.

Figure 10:
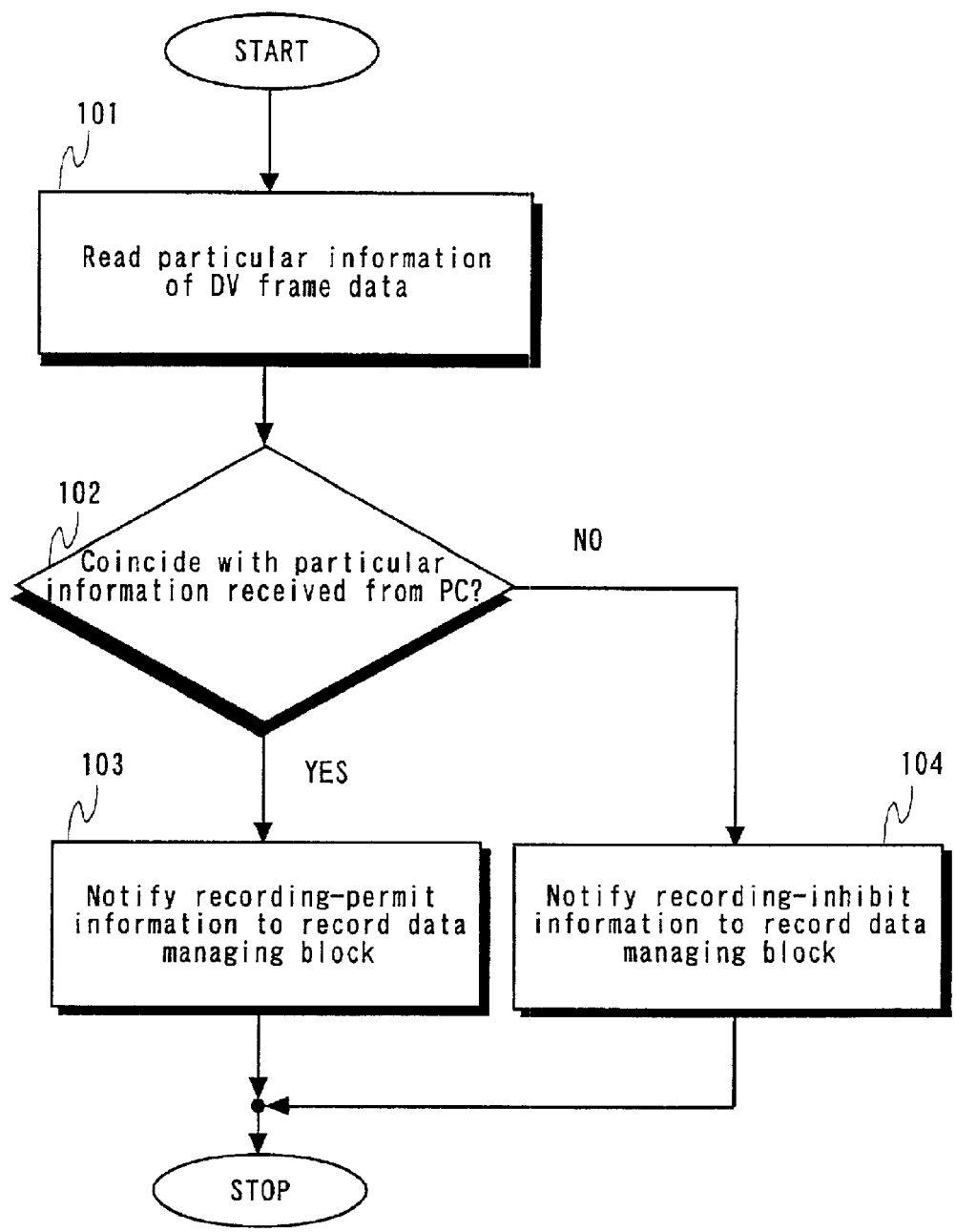
FIG. 10 is a flow chart showing the operation of a data recording determining block in accordance with the embodiment of the present invention when receiving a frame detection record command.

The procedure of a fifth recording determination process when a frame search record command is received and the DV frame data corresponding to a predetermined ATN is recorded is described below with reference to FIG. 10. FIG. 10 is a flow chart showing the procedure of the fifth recording determination process in the data recording determining block 15.

In the present embodiment, an ATN is received as the particular information corresponding to the DV frame data to be recorded with the frame search record command from the PC. The received ATN is stored temporarily in the data recording determining block 15.

On receiving a frame storing notice from the buffer control circuit 14, the data recording determining block 15 performs the procedure of the fifth data recording determination process.

In FIG. 10, in Step 101, an ATN as the particular information is read out from the DV frame data in the memory circuit 13.

Next, in Step 102, the read-out ATN is compared with the ATN stored temporarily after the reception from the PC. When the read-out ATN coincides with the ATN received from the PC, the received DV frame data is determined as record frame data.

When the received DV frame data is determined as record frame data, in Step 103, the record data managing block 16 is notified that the DV frame data is recording-permitted.

On the other hand, in Step 102, when the ATN's do not coincide, the received DV frame data is determined as disposal frame data, and in Step 104, the record data managing block 16 is notified that it is recording-inhibited.

In the operation after the above-mentioned fifth data recording determination process, the record data managing block 16 and the data recording control block 18 operate substantially similarly to the process in response to the above-mentioned data extraction REC command. Accordingly, only the DV frame data which is determined as record frame data by the data recording determining block 15 is recorded in the hard disk drive 19.

In the present embodiment, an ATN is used as the particular information of the DV frame data for the recording determination. However, any information, such as the other header information like TTC and audio-visual data, permitting the specification of the DV frame data may be used without restriction by the configuration of the above-mentioned embodiment.

In the present embodiment, description was made in the example in which the data recording apparatus in accordance with the present invention is connected to a PC. However, similar effect is obtained even in the case that it is connected to a device, other than a PC, capable of transmitting and receiving audio-visual data.

Further, in the present embodiment, description was made in the example of the connection to a PC through an IEEE1394 bus. However, any bus capable of transmitting and receiving audio-visual data may be used in the present invention without restriction by the configuration of the above-mentioned embodiment.

Furthermore, in the present embodiment, description was made in the operation for the DV data received through an IEEE1394 bus. However, similar effect is obtained even in the case of a data format, such as MPEG, other than the DV data.

As is obvious from the detailed description of the embodiments, the present invention has the following effect.

In accordance with the present invention, it is possible to provide a data recording apparatus capable of recording, on a disk, the data having the same recording time as the original audio-visual data saved on transmitting device, by controlling the DV frame transmitted by the frame re-transmission control so as not to be recorded on the disk in case of the occurrence of frame dropping on the transmitting device.

Further, in accordance with the present invention, it is possible to provide a data recording apparatus capable of recording, on a disk, the record data selected among the received data on a frame basis in response to an external request.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A data recording apparatus comprising:
    data transmitting and receiving means for transmitting and receiving the data to and from the outside;
    a buffer capable of storing said data temporarily;
    buffer controlling means for controlling the input and output of said data to and from said buffer;
    a disk drive capable of recording said data;
    data recording and reproducing means for recording and reproducing said data into and from said disk drive;
    data recording determining means for determining whether said data stored in said buffer is to be recorded or not in said disk drive and generating the recording-or-not information;
    record data managing means for managing the recording-or-not information for said data stored in said buffer; and
    data recording controlling means for controlling said buffer controlling means and said data recording and reproducing means so as to perform the recording control of said data in the buffer into said disk drive; wherein
    said data transmitting and receiving means sequentially transfers said data received from the outside into said buffer controlling means, and said buffer controlling means stores said transferred data into said buffer and notifies the completion of receiving a data block to said data recording determining means at each time when said data block in a predetermined unit is stored in said buffer.

2. A data recording apparatus in accordance with claim 1, wherein said data recording determining means reads the particular information capable of identifying from the other data blocks, from a data block stored in said buffer, determines whether the received data block is the same as a data block received previously or not on the basis of the read particular information, and notifies the recording-or-not information whether said received data block is to be recorded or not in said disk drive to said record data managing means on the basis of the result of the determination, further wherein
    said record data managing means stores said recording-or-not information correspondingly to said data block stored in said buffer, and wherein
    said data recording controlling means retrieves the recording-or-not information corresponding to said data block stored in said buffer, and performs transfer control on said data recording and reproducing means on the basis of the retrieved recording-or-not information.

3. A data recording apparatus in accordance with claim 2, wherein said data recording controlling means issues a transfer starting request for said data block to said buffer controlling means and said data recording and reproducing means when the retrieved recording-or-not information is recording-permitted, and retrieves the recording-or-not information of the next data block thereby to perform transfer control when it is recording-inhibited.

4. A data recording apparatus in accordance with claim 1, wherein said data recording determining means reads out, from the data block stored in said buffer, the particular information indicating whether the data block is to be recorded in the disk drive, determines the validity/invalidity of the data block on the basis of the read particular information, and notifies the result of the determination as the data recording-or-not information to said record data managing means, further wherein said record data managing means stores said recording-or-not information correspondingly to said data block stored in said buffer, and wherein said data recording controlling means retrieves the recording-or-not information corresponding to said data block stored in said buffer, and performs transfer control on said data recording and reproducing means on the basis of the retrieved recording-or-not information.

5. A data recording apparatus in accordance with claim 4, wherein said data recording controlling means issues a transfer starting request for said data block to said buffer controlling means and said data recording and reproducing means when the retrieved recording-or-not information is recording-permitted, and retrieves the recording-or-not information of the next data block thereby to perform transfer control when it is recording-inhibited.

6. A data recording apparatus in accordance with claim 1, wherein said data recording determining means reads out, from said data block stored in said buffer, the particular information capable of identifying whether the data format of said data block is normal or abnormal, determines the normalness/abnormalness of the data block on the basis of the read particular information, and notifies the result of the determination as the data recording-or-not information to said record data managing means, further wherein said record data managing means stores said recording-or-not information correspondingly to said data block stored in said buffer, and wherein said data recording controlling means retrieves the recording-or-not information corresponding to said data block stored in said buffer, and performs transfer control on said data recording and reproducing means on the basis of the retrieved recording-or-not information.

7. A data recording apparatus in accordance with claim 6, wherein said data recording controlling means issues a transfer starting request for said data block to said buffer controlling means and said data recording and reproducing means when the retrieved recording-or-not information is recording-permitted, and retrieves the recording-or-not information of the next data block thereby to perform transfer control when it is recording-inhibited.

8. A data recording apparatus in accordance with claim 2, 4, or 6, wherein said data recording determining means determines the recording-or-not for all the data blocks every a frame data when receiving a data recording determination starting request from the outside, and determines that all the data blocks are recording-permitted when not receiving a data recording determination starting request from the outside.

9. A data recording method comprising the steps of:
transmitting and receiving the data to and from the outside by data transmitting and receiving means;
storing said data temporarily by a buffer;
controlling the input and output of said data to and from said buffer by buffer controlling means;
recording said data by a disk drive;
recording and reproducing said data into and from said disk drive by data recording and reproducing means;
determining whether said data stored in said buffer is to be recorded or not in said disk drive and generating the recording-or-not information by data recording determining means;

managing the recording-or-not information for said data stored in said buffer by record data managing means;
controlling said buffer controlling means and said data recording and reproducing means so as to perform the recording control of said data in the buffer into said disk drive by data recording controlling means;
sequentially transferring said data received from the outside into said buffer controlling means by said data transmitting and receiving means;
storing said transferred data into said buffer by said buffer controlling means; and
notifying the completion of receiving a data block to said data recording determining means at each time when said data block in a predetermined unit is stored in said buffer.

10. A data recording method in accordance with claim 9, wherein said data recording determining means reads the particular information capable of identifying from the other data blocks, from a data block stored in said buffer, determines whether the received data block is the same as a data block received previously or not on the basis of the read particular information, and notifies the recording-or-not information whether said received data block is to be recorded or not in said disk drive to said record data managing means on the basis of the result of the determination, further wherein said record data managing means stores said recording-or-not information correspondingly to said data block stored in said buffer, and wherein said data recording controlling means retrieves the recording-or-not information corresponding to said data block stored in said buffer, and performs transfer control on said data recording and reproducing means on the basis of the retrieved recording-or-not information.

11. A data recording method in accordance with claim 10, wherein said data recording controlling means issues a transfer starting request for said data block to said buffer controlling means and said data recording and reproducing means when the retrieved recording-or-not information is recording-permitted, and retrieves the recording-or-not information of the next data block thereby to perform transfer control when it is recording-inhibited.

12. A data recording method in accordance with claim 9, wherein said data recording determining means reads out, from the data block stored in said buffer, the particular information indicating whether the data block is to be recorded in the disk drive, determines the validity/invalidity of the data block on the basis of the read particular information, and notifies the result of the determination as the data recording-or-not information to said record data managing means, further wherein said record data managing means stores said recording-or-not information correspondingly to said data block stored in said buffer, and wherein said data recording controlling means retrieves the recording-or-not information corresponding to said data block stored in said buffer, and performs transfer control on said data recording and reproducing means on the basis of the retrieved recording-or-not information.

13. A data recording method in accordance with claim 12, wherein said data recording controlling means issues a transfer starting request for said data block to said buffer controlling means and said data recording and reproducing means when the retrieved recording-or-not information is recording-permitted, and retrieves the recording-or-not information of the next data block thereby to perform transfer control when it is recording-inhibited.

14. A data recording method in accordance with claim 9, wherein said data recording determining means reads out, from said data block stored in said buffer, the particular information capable of identifying whether the data format of said data block is normal or abnormal, determines the normalness/abnormalness of the data block on the basis of the read particular information, and notifies the result of the determination as the data recording-or-not information to said record data managing means, further wherein said record data managing means stores said recording-or-not information correspondingly to said data block stored in said buffer, and wherein said data recording controlling means retrieves the recording-or-not information corresponding to said data block stored in said buffer, and performs transfer control on said data recording and reproducing means on the basis of the retrieved recording-or-not information.

15. data recording method in accordance with claim 14, wherein said data recording controlling means issues a transfer starting request for said data block to said buffer controlling means and said data recording and reproducing means when the retrieved recording-or-not information is recording-permitted, and retrieves the recording-or-not information of the next data block thereby to perform transfer control when it is recording-inhibited.

* * * * *